United States Patent [19]

Schmid et al.

[11] Patent Number: 4,843,230

[45] Date of Patent: Jun. 27, 1989

[54] DEVICE FOR MECHANICALLY RECEIVING EMPTIES WITH MOVING SENSOR HEAD

[75] Inventors: Dieter Schmid; Peter Kasberger, both of Aystetten, Fed. Rep. of Germany

[73] Assignee: Lescha Maschinenfabrik GmbH & Co. KG, Fed. Rep. of Germany

[21] Appl. No.: 187,928

[22] Filed: Apr. 29, 1988

[30] Foreign Application Priority Data

May 12, 1987 [DE] Fed. Rep. of Germany ....... 3715816

[51] Int. Cl.[4] ............................................. G01N 9/04

[52] U.S. Cl. ................................ 250/223 B; 250/560

[58] Field of Search ............... 250/223 R, 223 B, 560, 250/561; 209/525; 356/240

[56] References Cited

U.S. PATENT DOCUMENTS 4,253,573 3/1981 Dubberly et al. ............... 259/223 B
4,731,649 3/1988 Chang et al. ........................ 356/240

*Primary Examiner*—David C. Nelms
*Attorney, Agent, or Firm*—Jones, Tullar & Cooper

[57] ABSTRACT

In the context of a device for mechanically receiving empties in the form of bottle crates and other containers for bottles subject to a deposit, comprising a frame, at least one conveying device forming the lower limit of a conveying passage and which is adapted to move the empties past a sensing device improved functional reliability is achieved by an arrangement in which the sensing device comprises a sensing head extending over the conveying device, said sensing head being able to be raised and lowered by means of an actuator operated by the passage of an article moved by the conveying device and cooperating with a measuring device responding to its stroke, said sensing device comprising sensing elements arranged in the form of a row arranged to extend perpendicularly to the direction of conveying and arranged in relation to a fixed plane of an aligning device aligning the passing articles so as to be parallel to the conveying direction, said sensing elements being arranged to be actuated by articles under them and cooperating with a counting device.

15 Claims, 4 Drawing Sheets

FIG 6
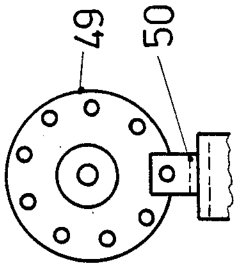
FIG 2
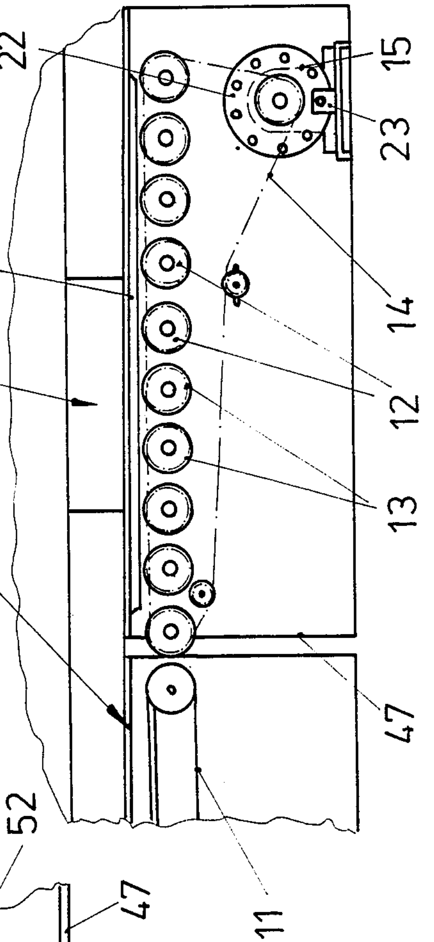
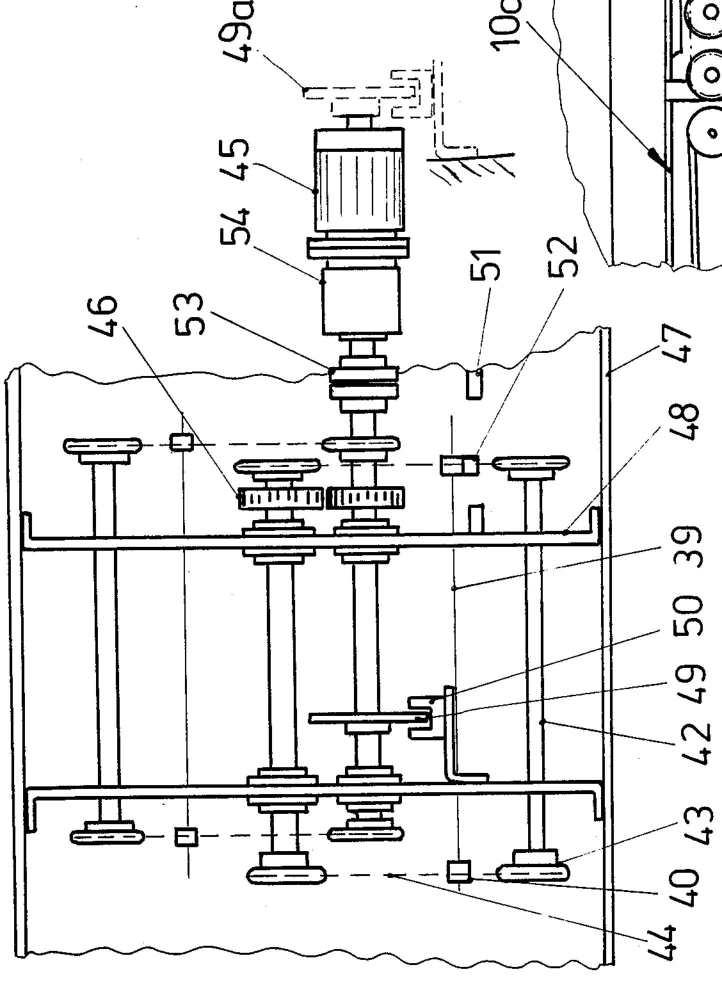
FIG 5

DEVICE FOR MECHANICALLY RECEIVING EMPTIES WITH MOVING SENSOR HEAD

BACKGROUND OF THE INVENTION

The present invention relates to a device for mechanically receiving empties, more especially in the form of bottle crates with and without bottles subject to a deposit, comprising at least one conveying device forming the lower limit of a conveying passage and which is adapted to move the empties past a sensing device.

When crates of bottles are returned to the supplier it is normally necessary for money to be paid back both in respect of the crate and also of the bottles themselves. It is thus necessary to identify the crate and to numerically ascertain and to classify the content of the crate.

SUMMARY OF THE INVENTION

Taking this state of the art as a starting point one object of the invention is thus to devise a device of the initially mentioned type which is able to receive crates completely or partly filled with containers such as bottles or the like and to compute refunds thereon.

In order to achieve this or other objects appearing from the present specification and claims the sensing device comprises a sensing head extending over the conveying device, said sensing head (which is able to be raised and lowered by means of an actuator operated by the passage of an article moved by the conveying device and cooperating with a measuring device responding to its stroke) comprising sensing elements arranged in the form of a row arranged to extend perpendicularly to the direction of conveying and arranged in relation to a fixed plane of an aligning device aligning the passing articles so as to be parallel to the conveying direction, said sensing elements being arranged to be actuated by articles under them and cooperating with a counting device.

This system ensures that the sensing head is always at the same distance from the top edge of the crate whatever the type of crate being handled. As a consequence of this one may be certain that the sensing elements present for sensing the content of the crate only require comparatively small sensing or measuring range or stroke in order to detect the bottles present in the crate, the bottles as a rule extending up as far as short distance under the top edge of the crate. The motion of the sensing head in accordance with the invention in order to make engagement thus enables a precise sensing of the empties to be made with the least likelihood of errors. For instance, owing to the small measuring stroke of the sensing elements, it is possible to ensure that the compartment walls, which as a rule only extend for part of the overall height of the crate, are well clear of the measuring stroke and are not able to lead to false readings. Owing to this there is the advantage that the sensing elements may be in the form of optical elements designed as reflective photoelectric detectors which provide signals which are easy to process. A further and more particularly significant advantage of the way of moving the sensing head of the invention is to be seen in the fact that this system at the same time makes it possible to ascertain the height of the crate so that together with the breadth of the crate (which may be ascertained since the crate is aligned in parallelism by the aligning device of the invention) and the length of the crate (which may be readily ascertained from the time taken by a crate to pass through the sensing device) it is sible to reliablly identify the type of crate.

In accordance with an advantageous feature of the invention it is possible for the initial position of the actuator to be set by means of an upper abutment which is fixed to the frame and is preferably in the form of a baffle able to be sensed by means of a photoelectric detector arranged on the actuator. The stroke of the actuator at the lower stop setting may then advantageously be a height sensor which is advantageously also in the form of a photoelectric detector and is designed to sense the upper edge of the article as it moves past. This feature of the invention means that it is possible to exactly ascertain the distance between the upper abutment and the top edge of the crate with the result that the height of the crate may be clearly determined. The advantage of optical sensing is that the signals produced may be readily processed and errors are avoided at the same time, which would otherwise be likely in a mechanical system owing to inertia.

It is convenient if two photoelectric detectors offset in relation to each other in level are arranged on the actuator, the lower photoelectric detector being in the form of a height sensor responding to the upper edge of the crate and the upper photoelectric detector being a sensor adapted to detect any articles projecting above the upper edge of the crate and preferably as a crate recognizing sensor associated with the upper abutment. Since it makes it possible to recognize projecting articles this feature of the invention enhances operational reliability. At the same time the feature involves the production of signals which are simple to conduct and process.

For the sake of reliable operation it may be expedient to provide a lower abutment which is in the form of a baffle adapted to be sensed by a photoelectric detector and which sets the lower limit for the maximum stroke of the actuator. This ensures that in the event of improper operation of the actuator the sensing head will be stopped on reaching the lower abutment so that there is no chance of it stroking over parts of the system.

As part of a further development of the invention the actuator may be provided on each of the two sides of the conveying device with a cord or the like running over at least one bend member and preferably provided with a balancing weight, and which acts on a bearer, preferably in the form of a bearing plate, associated with the sensing head, said bearer being carried on a guide device which is preferably in the form of a parallelogram. This feature of the invention leads to the advantage that a comparatively large stoke may be performed which may be readily measured with the aid of an incremental disk. At the same time these features lead to a smooth manner of operation free of jerks.

It is furthermore convenient if the measuring device associated with the actutuator accordingly have an incremental disk which is driventogether with the actuator and is for instance in the form of preforated disk, such incremental disk being sensed by an associated sensor, which is preferably able to be switched on and off by the photoelectric detector arranged on the actuator. This feature leads to the advantage of exact ascertainment of the crate height while avoiding errors due to lag.

It is a further advantage if the actuator and the aligning device are arranged to be put into operation by means of a length sensor preferably in the form of a photoelectric detector extending across the conveying plane so that the length sensor preferably simultaneously halts the conveying device until the end of the aligning operation. These features ensure that the aligning operation and the motion of the sensing head into position take place in strict synchronism, something that despite the halt in the advancing motion, preferably carried out in order to avoid erros, during the aligning operation makes a high throughput rate possible.

As a further feature of the invention it is possible for the aligning device to have at least one slide which is arranged above the conveying device and is preferably in the form of a lateral limit or wall of the passage, so that the slide may be moved perpendicularly in relation to the conveying direction by a transverse actuator preferably arranged under the conveying device, the transverse actuator simultaneously serving to drive an incremental disk, which is preferably in the form of a perforated disk, which is sensed by means of a associated sensor. These measures lead to a high degree of accuracy both as regards parallel alignment and also as regards the simultaneously occurring measurement of breadth. The incremental disk used in this form of the invention leads not only to the added advantage of satisfactory resolution of the distance measured but furthermore to a simple digital processing of the signals produced. This furthermore applies for the measurement of height and length.

For measuring length it is possible to use an incremental disk arranged to be driven with the section passing under the sensing head of the conveying device so that the disk is sensed by an associated sensor, which is able to be put into and out of operation by a sensor, which is preferably in the form of a photoelectric detector arranged over the conveying device.

Further advantages and features of the invention will be seen from the following more detailed account of the invention referring to the drawing.

LIST OF THE SEVERAL VIEWS OF THE DRAWINGS

FIG. 2 is a partial side view of the conveying device, as seen from the drive side, associated with the crate receiving station.

FIG. 5 is a view looking upwards of the aligning station station of the arrangement as in FIG. 3.

FIG. 6 is a view of an incremental disk with the associated sensor.

DETAILED ACCOUNT OF WORKING EXAMPLE OF THE INVENTION

Figure 1:
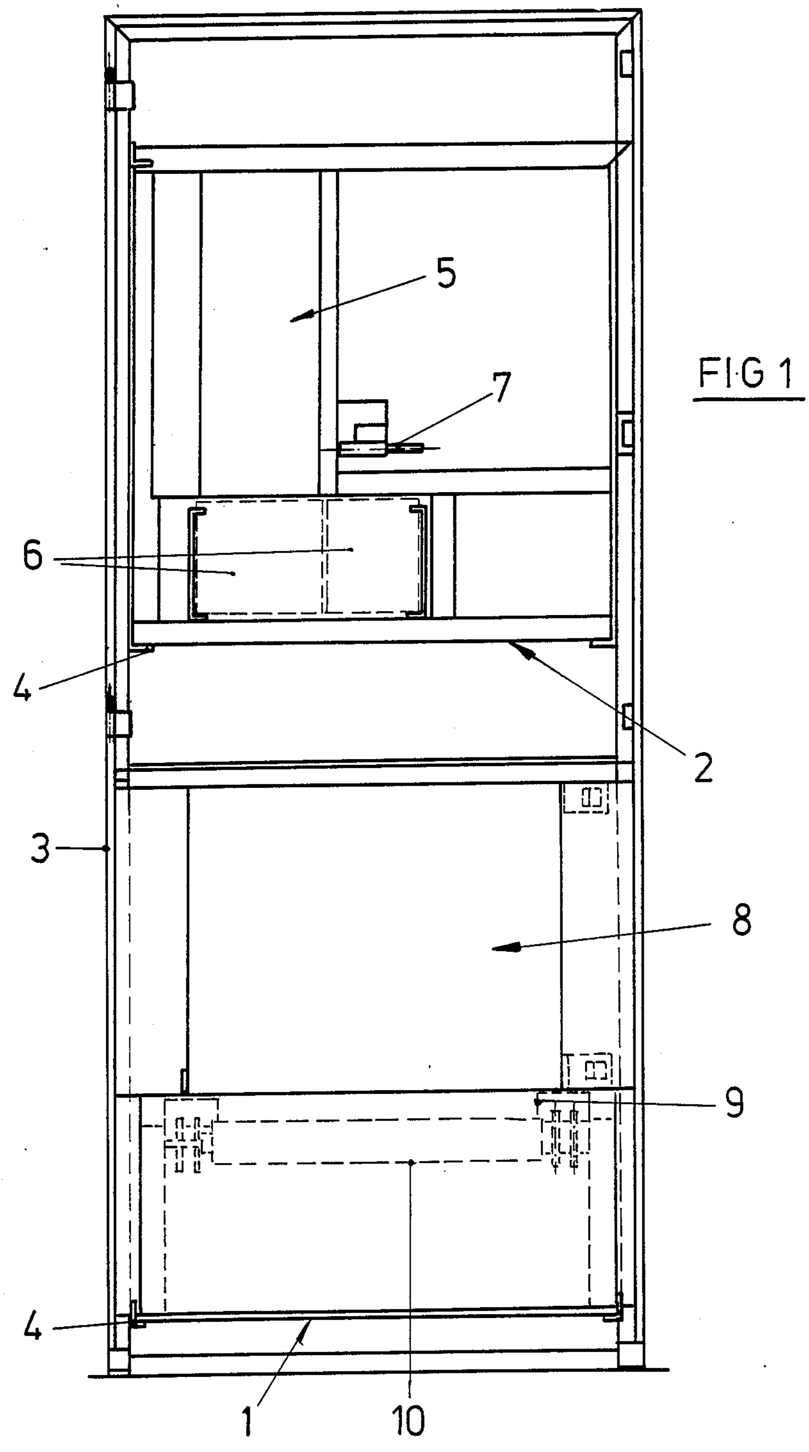
FIG. 1 is a front view of an empties receiving device with a bottle and a crate receiving station.

The empties receiving machine to be seen in FIG. 1 comprises a crate receiving station 1 and a bottle receiving station 2. These two stations are located one over the other as if they were on two storeys, the crate receiving station 1 forming the lower storey and the bottle receiving station 2 forming the upper storey. The machine frame of the empties receiving machine illustrated here consists of portal frames 3, which are connected with each other by horizontal rails 4. For forming the crate receiving station 1 and the bottle receiving station 2 there are drawer-like members mounted on these rails.

The bottle receiving station 2 comprises a passage 5 extending from a front input opening and whose floor is formed by two laterally offset conveying belts 6 which serve to draw in the bottles placed in the passage, to align them in a row and to move them past bottle sensing means 7. The crate receiving station 1 also comprises a front opening from which a passage 8 extends, which has side walls in the form of sheet metal guides 9 and is arranged over a conveying device 10, for moving the empties past sensing means, to be described in more detail below, for identifying the crates received and for ascertaining the degree to which they are filled. The conveying plane of the conveying device 10 is somewhat under the lower edge of the front entry opening so that there is a safety step.

The conveying device 10 of the crate receiving station 1, consists, as may best be seen from FIG. 2, of two tandem-arranged sections 10*a* and 10*b*, which are driven at different speeds. The section 10b whic is to the fore in the direction of conveying, is run at a higher speed than the section 10*a* which is to the rear in the direction of conveying so that consecutive crates are drawn apart. The rear section 10*a* in the direction of conveying moving at a lower speed has a longitudinal conveying belt 11 moving over a table and serving as the conveying means. This conveying belt provides for a particularly low risk of accidents in the input part of the system. The front section 10*b* is in the form of a roller conveyor in the illustrated example and its rollers 12 are all driven and provided with lateral sprockets 13 which are engagement with a chain engaging all the sprockets 13. The chain is driven by a drive unit 15. In order to ensure reliable engagement between the chain and the sprockets there is one presser rail 16 at least extending sufficiently far along to hold the chain in engagement with sprockets to which it is merely at a tangent.

The crates to be received at the crate receiving station 1 are identified by measuring the length, height and breadth. In order to additionally ascertain the degree of filling of the crates there is a sensing head 17, best to be seen in FIGS. 3 and 4, running over the conveying device which has a number of sensing elements 18 in a row so as to be arranged extending across the conveying device. These sensing elements are in the form of reflecting photoelectric detectors which emit a beam of light and ascertain whether a reflected light beam is returned or not. A reflected light beam will be returned if the emitted light beam impinges on a plane, reflective surface within the given measuring range. This surface may for instance be the top end surfaces of the necks of bottles 20 contained in a crate 19 being transported along under sensing head 17. The reflective light switches forming the sensing elements 18 produce a continuous signal when they sense a reflected beam. This continuous signal may be logged or interrogated at set intervals, dependent on the speed of the conveying device 10 in order to faciliate signal processing. The result is then signal points which occur in the form of a given grid dependent on the disposal of the compartments 21 in the crate 19. The interrogating steps may simply be set by an incremental disk 22 as shown in FIG. 2 to be driven together with the chain 14 and designed in the form of a perforated disk which is sensed by means of an associated sensor 23.

A grid corresponding to the arrangement of compartments 21 in this crate is then superimposed on this pattern of points after identification of the crate 19 so that the degree to which the crate is filled is then automatically ascertained. Each grid compartment, which contains at least one signal point or dot, practically corresponds to one compartment of the crate 19 with a bottle 20 therein. The processing of such data then takes place in a computer which is not shown in detail in the drawing and which is coupled with a printer for a printout of the deposit value of the returned empties.

If the set range of measurement of the reflective photoelectric switches forming the sensing elements 18 is sufficiently large, it may be the case that not only the ends faces of the bottle necks, which are just under the lower top edge of the crate come within the field of measurement but also the top end surfaces of compartment divisions etc. so that they reflect the light beams impinging thereon, this possibly leading to a falsification of the result. For this reason it is desirable to have a comparatively small range of measurement of the sensing elements 18. In order nevertheless to arrange for a high degree of adaptability as regards the different possible crate heights, the entire measuring head 17 is shifted in a direction perpendicular to the conveying plane in accordance with the respective height of the crate 19 which is just moving past. For this purpose the sensing head 17 is provided with an actuator 22, which, as will be seen from FIGS. 3 and 4 in addition, in the illustrated working example of the invention consists of two relatively opposite toothed belts 23, which are trained over two superposed toothed belt driving wheels 24, one of such wheels being driven in each case. For this purpose the upper toothed belt wheels 24 are arranged on a continuous shaft 25, which is driven by means of a chain drive 26 from a drive motor which is not shown in detail. On the two toothed belts 23 there is in each case, as will best be seen from FIG. 4, a carriage 28 mounted on an upright guide column 27. The oppositely placed carriages 28 are bridged over by a beam 29 on which the sensing elements 28 are placed in a row. As a rule it is sufficient to have eleven to fifteen sensing elemetns 28 placed adjacent to each other in order to determine the degree of filling of any of the currently used bottle crates in an exact manner.

Each time a crate moves past it, the sensing head 17 is reset on the basis of an upper initial setting. This upper initial position is defined by an abutment fixed to the frame. In the illustrated working example it is, as will be seen from FIG. 4, a question of a baffle 30 arranged in fixed manner on the frame, and which is optically sensed or scanned by a photoelectric detector 31 connected to the sensing head 17. As soon as a crate 19 arrives on the section 10b, passing under the sensing head 17, of the conveying device, the actuator 22 is put into operation. This putting into operation of the actuator 22 takes place via a photoelectric detector 32 extending over the conveying device 10 as soon as the light beam of the photoelectric detector is interrupted by the moving crate 19, The operation of the actuator is terminated as soon as the photoelectric detector 31 mounted on the actuator 22, or another photoelectric detector vertically offset therefrom and also arranged on the actuator 22, reaches the upper edge of the crate 19. For safety reasons there is also a lower baffle 34 (also fixed to the frame) in order to limit the maximum stroke of the actuator 22. In order to mount the elements of the photoelectric detectors 31, 33 on the actuator 22 there are bearing plates 35 on the carriage 29 which extend away from the sensing head 17 in a direction opposite to the direction of conveying of the device 10. That is to say, they are arranged ahead of the sensing head 17. The motion of the sensing head 17 into the desired position as controlled by the photoelectric detectors 31 and 33 is then terminated, when the crate 19 arrives under the sensing head 17.

The logical connection of the photoelectric detectors 31 and 33 may for safety reasons be such that the lowered sensing head 17 remains in placed as long as only the lower photoelectric detector 33 is still detecting the upper edge of the crate and the upper photoelectric detector 31 for use with the baffle 30 is not detecting. If a crate 19 comprises a projecting article as for instance in the form of an oversize bottle 20*a*, this necessarily leads to detection by the photoelectric detector 31, as will be seen from FIG. 4. In such a case the conveying device 10 may be stopped or reversed and/or the sensing head 17 raised in order to avoid the oversize bottle 20*a* colliding with anything. Such a crate is accordingly either rejected or accepted without it and its contents being detected and without any calculation of a deposit to be refunded.

The stroke of the actuator 22 is employed for measuring the height of the crate 19. The measuring device provided for this purpose will be seen more particularly from FIG. 3, to comprise an incremental disk 36 which is in the form of a preforated disk arranged to be driven by the actuator 22 so that it may be read by the associated sensor 37 which is so operated by the photoelectric detectors 31 and 33 respectively, mounted on the actuator 22 that counting is started as soon as the baffle 30 has cleared the photoelectric detector 31 and will be terminated as soon as the lower beam of the lower photoelectric detector 33 is interrupted by the upper edge of the crate 19. The incremental disk 36 is mounted on the shaft 25 in the present working example of the invention so that as a rule there is a speed of rotation which is sufficient for resolving the stroke of the actuator 22. A still better resolution may be achieved in a simple manner by arranging the disk 36 between the drive motor and a step-down transmission. The number of signals received by the sensor 37 will be representative of the distance of the top edge of the crate from the baffle 30, which distance from the conveying plane is a datum quantity so that the height of the crate may be readily worked out. The processing of the signals takes place in a computer which is not shown, the signals produced with the aid of the sensor 37 cooperating with the incremental disk 36 making possible digital signal processing.

In order to ascertain the length of the crate 19 the incremental disk 22 driven together with the chain 14 is used, that is to say the pulses produced by the sensor 23 associated with it are counted as long as the crate 19 is moving past the photoelectric detector 32 arranged across the direction of conveying. The sensor 23 is accordingly turned on and off by the photoelectric detector 32. It would however also be possible for the length of the crate to be ascertained using the sensing head 17. The directly response to the incremental disk 22 however does lead to a simplificaiton of the computing operation for working out the degree of filling. Since all the rollers 12 of the section 10*b* of the conveying device in the form of the roller conveyor are driven by means of the chain 14, a reliable and practically slip-free entrainment of the crate 19 is ensured, this leading into a highly accurate measurement of length. For ensuring a particularly reliable conveying action the rollers 12 may be rubber-coated.

Figure 3:
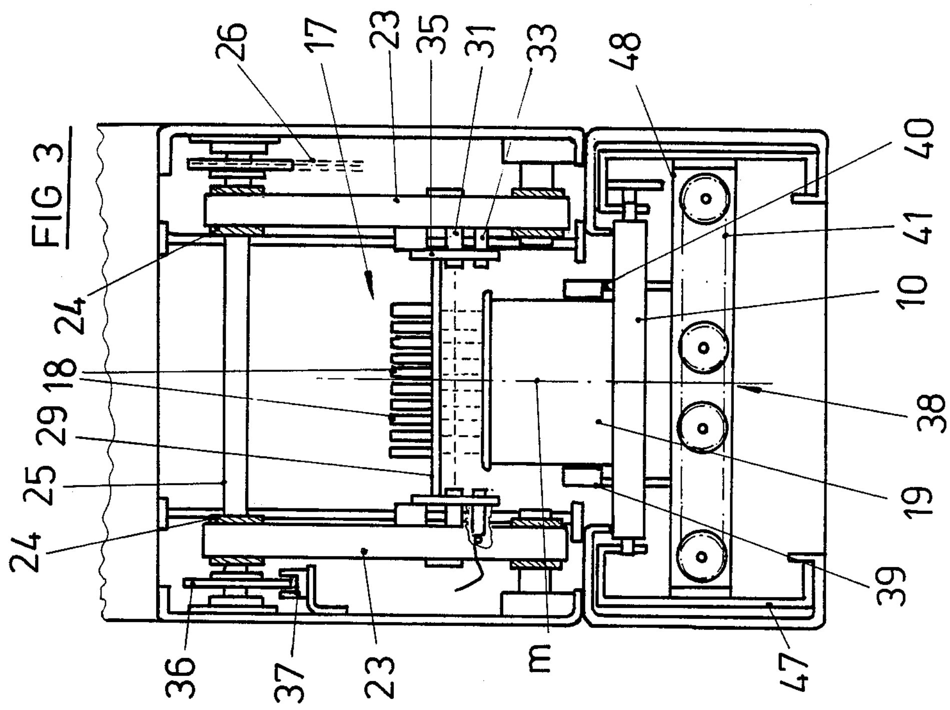
FIG. 3 is a diagrammatic vertical section taken through the crate receiving station.
Figure 4:
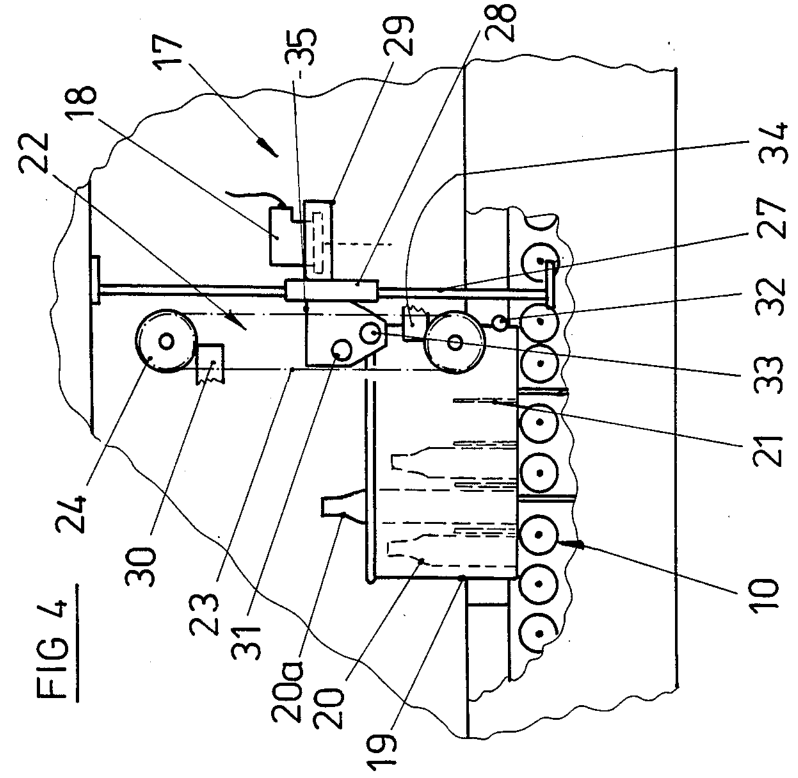
FIG. 4 is a diagrammatic side view of the arrangement to be seen in FIG. 3.

The sensing head 17 is, as will be seen from FIGS. 3, aligned with the longitudinal plane m of the conveying device 10, that is to say the row of sensing elements on the sensing head 17 is placed symmetrically to the longitudinal median plane m. The crates as transporeted by the conveying device 10 are accordingly aligned symmetrically in relation to the median longitudinal plane m prior to entering the range of action of the sensing head 17. For this purpose there is an aligning device 38, which as will be readily seen from FIG. 3 comprises two oppositely placed slides 39 extending over the conveying device 10 and which may be in the form of moving sections of the side walls or limits 9 of the passage 8. The slides 39 are attached to arms 40 each extending between two rollers 12, which are mounted on a transverse actuator 41 arranged under th conveying device 10.

The transverse actuators 41 are, as will best be seen from FIG. 5, in the form of belt or chain driven which are arranged transversely in relation to the direction of conveying of the conveying device 10. In the present example of the invention each transverse actuator 41 comprises two shafts 42 extending in the direction of conveying, which at their ends bear sprocket wheels 43, which have chains 44 trained over them attached to the arms 40 of the slides 39. In order to drive the two actuators 41 there is a drive motor 45, which is coupled with one of the shafts 42 which by means of spur wheel gearing 46, which ensures that exact opposte rotation takes place, is connected with an adjacent shaft of the respectively other transverse actuator. The shafts 42 run on transverse beams 48 attached to the longitudinal beams 47 of the section **10*b* of the conveying device 10. The operation of the aligning device 38 takes places together with the operation of the actuator 22 under the control of the same photoelectric detector 32. If in a special application it should be necessary to halt the conveying device 10 during operation of the aligning device 38, this will be readily possible. For this purpose the conveying device 10 may be halted by means of the photoelectric detector 32 putting the aligning device 38 into operation. After alignment of the crate, this is to say when the transverse actuators 41 are no longer moving, the conveying device 10** will be restarted in this case.

The stroke of the transverse actuators 41 is used for measuring the breadth of the crate 19. For this purpose there is an incremental disk 49 driven with the transverse actuators 41 and which, as will best be seen from FIG. 6, may be in the form of a perforated disk with an associated sensor 50. The starting position of the transverse actuators 41 is set by means of a photoelectric detector 51 secured to the frame and which senses a baffle 52 secured to an adjacent chain 44. The counting of the pulses from the sensor 50 begins as soon as the photoelectric detector 51 is no longer obstructed. As is indicated in full lines in FIG. 5, the incremental disk 49 may be mounted on one of the shafts 42 driven by the motor 45. The speed of rotation of the incremental disk 49 is in this case the same as the speed of the sprocket wheels 43, this as a rule leading to a sufficiently good resolution of the measured range. The coupling 53, arranged between the motor 45 and the shaft 42 joined thereto, may in this case be in the form of a slipping clutch so that the motor is able to continue turning with slip after alignment has taken placed. Between the coupling 53 and the motor 45 there is in the present case a step-down drive 54. In order to ensure a degree of resolution of the measured range which is increased by the step-down ratio the incremental disk might simply be arranged on the input end of the step-down gearing 54, as is indicated in FIG. 5 in broken lines at 49. The coupling 54 would have to be a fixed coupling as opposed to a slip clutch so that after alignment has taken place the motor 45 would not be able to continue turning and accordingly the incremental disk **49*a*** joined thereto would also be stopped.

The dimensions, that is to sayd the length, breadth and height, are, as indicated above, used to identify the crate 19. For this purpose there is a computer containing all the likely crate sizes. The identification of the crate 19 makes possible not only a a refund of the crate deposit but also the selection of the compartment grid or pattern appropriate to the respective crate, such grid also be stored in the computer if desired. Together with the information supplied by the sensing head 17 this grid make possible the determination of the degree of the filling of the crate, that is to say answering the question as to how many bottles 20 if any are contained in the crate 19 and accordingly how many bottles 20 are to be refunded in addition to that on the crate 19. The overall refund may take place either in case or in the form of a credit note printed by the device.

Owing to the fact that the sensing head 17 is not rigidly arranged and rides onto the upper edge of the crate it is additionally possible to ensure that the filling of the crate may also be classified, that is to say it is also possible to see whether the bottles in the crate actually belong in it or are too high or too low. In the event of the bottles present being too high or too low, the computer may be so programmed that no refund is made at all so that the entire crate is lost.

Figure 7:
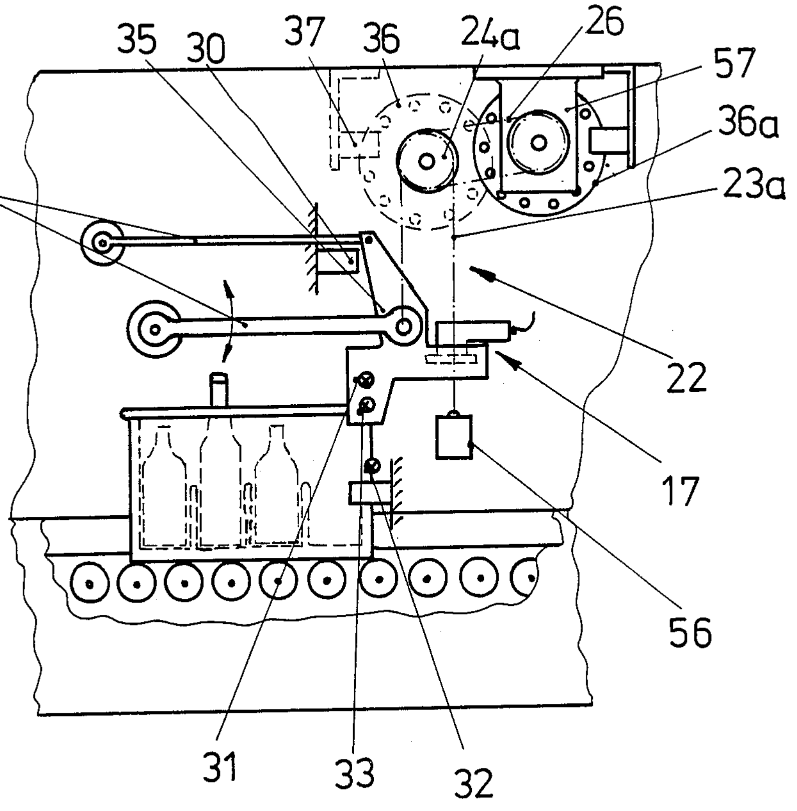
FIG. 7 shows a modified form of the actuator, associated with the sensing head, in a view similar to that of FIG. 4.

FIG. 7 shows a modification of the actuator 22 associated with the sensing head 17 in the case of which the downward motion takes place under the weight of the sensing head 17. In other respects the arrangement is the same as that shown in FIG. 7 in conjunction with FIGS. 3 and 4. The following account is restricted to the differences, like reference numerals being used for like parts. In this example of the invention the sensing head 17 is provided with two lateral bearing plates 35 on which superimposed photoelectric detectors 31 and 33 are mounted. The two bearing plates 35 are mounted on two parallel levers 55 in order to ensure fully controlled motion of the plates. The levers are on the one hand pivoted on the machine frame and on the other hand on the respectively associated bearing plate 35 so that effectively there is a parellelogram guide system.

In order to move the senser head 17 along its stroke 17 in each case a part of the said parallelogram system is mounted on chains **23*a* running over sprocket wheels. In order to ensure balancing of the weight and thus for relieving the driving means, there are balancing weights 56 on the chains 23*a*. In the illustrated working example the chains 23*a* are in the form of finite chains which each run on an associated sprocket wheel 24*a* placed above the stroke of the sensing head 17 and whose dependent ends are attached to an associated bearing plate 35, and respectively, a counter weight 56. The sprocket wheels 24*a* are mounted on a shaft 25 extending right over the full width of thee conveying passage, which is directy connector or, as in the present example, is indirectly connected via a chain 26 with a drive means, which may comprise a geared motor 57. The stroke of the sensing head 17 starting from an upper abutment 30 is measured by the incremental disk driven together with the actuator 22. This disk may either be mounted on the shaft 25 as is indicated at 36 or in order to ensure a large angle of turning and thus a high accuracy it may be arranged on the input side of the gearing of the geared motor 57, as is indicated at 36***a*.

Figure 8:
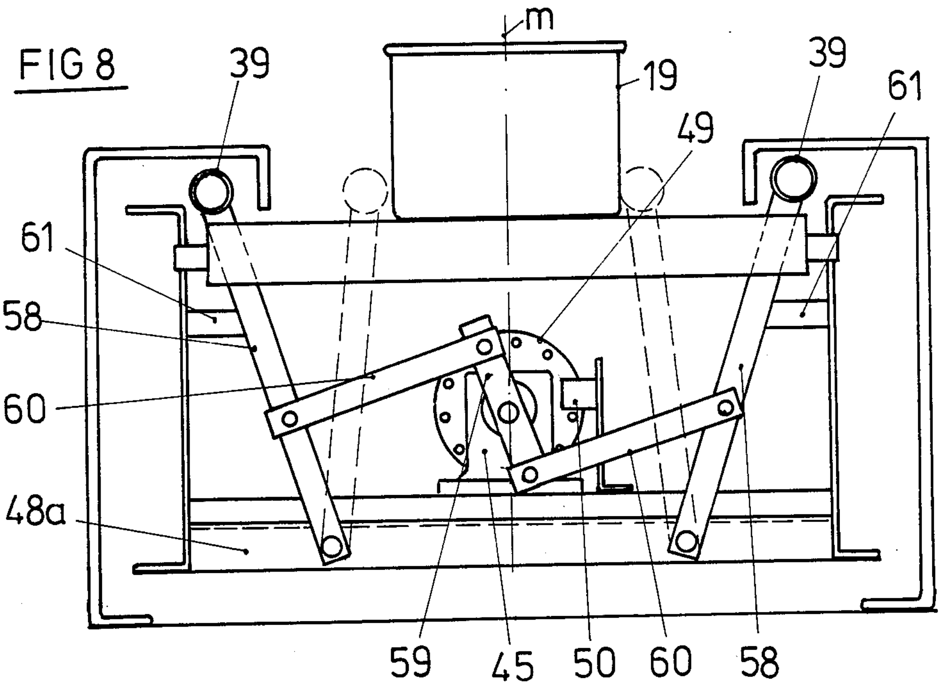
FIG. 8 shows a further possible form of the crate aligning device in a view similar to that of FIG. 3.

The different form of the crate aligning device as shown in FIG. 8 resembles the aligning device of FIGS. 3 and 5 in having two slides 39 operating symmetrically in relation to the median longitudinal plane m of the passage. In the present case the slides are in the form of bars retracting into niches arranged in front of the lateral walls of the passage. The bars are mounted on respectively associated pivoting arms 58 whose ends are mounted pivotally on the crosspieces 48*a* fitting under the conveying device. In order to operate the pivoting arms 58 there is a geared motor 45 arranged so that its shaft is adjacent to the median longitudinal plane m. Its output shaft has a rocking lever 59 keyed on it. The rocking lever 59 has its opposite ends in engagement with the oppositely placed pivoting arms 58. In the present example there are intermediate thrust rods 60 placed inbetween. The opposite ends of the rocking lever 59 move more or less in opposite directions so that there is the desired opposite motion of the pivoting arms 58. The initial position of the pivoting arms 58 indicated in full lines, of the pivoting arms 58 and accordingly of the slides 39 is set by abutments fixed to the frame. In the aligning setting indicated in FIG. 8 in broken lines the two opposite slides 39 make firm engagement with the centrally aligned crate 19. The distance between the opposite slides 39 then resulting corresponds to the breadth of the crate 19. In order to measure this breadth the angle of pivot of the pivoting arms 58 is measured, this being done by the incremental disk 49 driven by the pivoting arms 58 and sensed by an associated sensor 50. In order to ensure a large angle of turning and thus a high degree of accuracy this incremental disk may also be placed on the input side of the gearing of the geared motor 45.

We claim:

1. A device for mechanically receiving empties in the form of bottle crates and other containers for bottles subject to a deposit, comprising a frame, at least one conveying device forming the lower limit of a conveying passage and which is adapted to move the empties past a sensing device which comprises a sensing head extending over the conveying device, said sensing head being able to be raised and lowered by means of an actuator operated by the passage of an article moved by the conveying device and cooperating with a measuring device responding to its stroke, said sensing device comprising sensing elements arranged in the form of a row arranged to extend perpendicularly to the direction of conveying and arranged in relation to a fixed plane of an aligning device aligning the passing articles so as to be parallel to the conveying direction, said sensing elements being arranged to be actuated by articles under them and cooperating with a counting device.

2. The device as claimed in claim 1 wherein the upper initial position of the actuator is set by an upper abutment secured to the frame and wherein the stroke of the acuator is adapted to be terminated by a height sensor responding to an upper edge of an article moving past, said sensor preferably being in the form of a photoelectric detector.

3. The device as claimed in claim 2 wherein the upper abutment is in the form of a baffle adapted to be sesned by a photoelectric detector arranged on the actuator.

4. The device as claimed in claimm 3 comprising two vertically offset photoelectric detectors on the actuator, of which the lower one is in the form of the height sensor responding to the crate top edge and the upper one is a detecting sensor adapted to detect the presence of articles projecting past the upper edge of the crate and/or is the sensor cooperating with the abutment.

5. The device as claimed in claim 1 further comprising a lower abutment, preferably also in the form of a baffle, limiting the maximum stroke of the actuator.

6. The device as claimed in claim 1 wherein the actuator has at least one traction element, or more especially one such element on each side of the conveying device, extending over a driven band member, which is in engagement with carrier, preferaby in the form of lateral bearing plates, such carrier being mounted on a guide device which is preferably in the form of a parallelogram linkage.

7. The device as claimed in claim 6 comprising two bearing plates placed opposite to each other and receiving the sensing head between them, such bearing plates carrying respectively opposite elements of the photoelectric detectors.

8. The device as claimed in claim 1 wherein the measuring device associated with the actuator comprises an incremental disk, preferably in the form of a perforated disk and arranged to be driven together with the actuator and a sensor for cooperaitng with the disk, same being able to be turned on and off by photoelectric detectors mounted on the actuator.

9. The device as claimed in claim 1 wherein the actuator and the aligning device are arranged to be put into operation by means of a length sensor preferably in the form of a photoelectric detector extending over the conveying plane of the conveying device, such length sensor preferably halting the conveying device until the end of the aligning operation.

10. The device as claimed in claim 1 wherein the aligning device comprises at least one slide arranged over the conveying device and preferably in the form of part of the lateral wall of the passage, such slide being arranged to be driven by means of a transverse actuator preferably arranged under the conveying device and by means of which a preferably perforated incremental disk may be simultaneously driven, such disk being sensed by a sensor.

11. The device as claimed in claim 10 comprising two oppositely moving slides which are driven by transverse actuators operating symmetrically to the median longitudinal plane, forming the reference plane, of the conveying device, such actuators preferably being in the form of pivoting arms, which are connected with oppositely placed arms of a driven two-armed lever.

12. The device as claimed in claim 1 wherein the sensing elements mounted on the sensing head are preferably in the form of reflective photoelectric detectors, for measuring the time taken by the passing articles to move through the device, each produce continuous signals corresponding to the passage time and which are able to be interrogated at set invervals which are preferably produced by an incremental disk driven at the speed of the conveying device.

13. The device as claimed in claim 1 wherein the section of the conveying device passing through under the sensing head is able to be measured by a preferably perforated incremental disk driven together with this section, such disk being sensed by an associated sensor, which is able to be put into and out of operation by a sensor which is preferably in the form of a photoelectric detector arranged over the conveying device.

14. The device as claimed in claim 1 wherein the conveying device comprises two consecutively placed sections driven at different speeds the faster section to the fore in the direction of conveying passing under the sensing head being preferably in the form of a roller conveyor with rollers which are preferably rubber-coated and are driven by a chain common to all the rollers.

15. The device as claimed in claim 8 wherien the at least one incremental disk is arranged on the input side of gearing at a geared driving motor.

* * * * *